(12) United States Patent
Dabbagh et al.

(10) Patent No.: US 10,237,014 B1
(45) Date of Patent: Mar. 19, 2019

(54) LINK ADAPTATION ENHANCEMENTS

(71) Applicant: QUALCOMM Incorporated, San Diego, CA (US)

(72) Inventors: Amir Dabbagh, Haifa (IL); Raz Bareket, Haifa (IL); Nissan Aloni, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/836,806

(22) Filed: Dec. 8, 2017

(51) Int. Cl.
*H04L 1/00* (2006.01)
*H04L 1/18* (2006.01)

(52) U.S. Cl.
CPC .......... *H04L 1/0033* (2013.01); *H04L 1/0038* (2013.01); *H04L 1/1829* (2013.01); *H04L 1/0003* (2013.01); *H04L 1/0009* (2013.01)

(58) Field of Classification Search
CPC .......................... H04W 74/0816; H04W 74/08

USPC .......................... 375/260; 370/329, 341, 447
See application file for complete search history.

(56) References Cited

U.S. PATENT DOCUMENTS

2008/0207122 A1* 8/2008 Ahn ...................... H04L 1/0015
455/39

* cited by examiner

*Primary Examiner* — Kevin Kim
(74) *Attorney, Agent, or Firm* — Steven R. Thiel

(57) ABSTRACT

Certain aspects relate to methods, apparatuses, computer readable mediums and wireless nodes. For example, an apparatus generally includes an interface configured to obtain, during a TXOP owned by a second apparatus, at least one first frame from the second apparatus and a processing system configured to (i) determine a MCS associated with the at least one first frame, (ii) increase a value of a counter if the MCS associated with the at least one first frame is the same as a MCS associated with a frame previously obtained by the apparatus during the TXOP and (iii) take one or more actions based on the counter value.

20 Claims, 9 Drawing Sheets

LINK ADAPTATION ENHANCEMENTS

BACKGROUND

Field

The present disclosure generally relates to communications networks, and more particularly, to methods and apparatuses directed to link adaptation.

Background

Wireless communication networks are widely deployed to provide various communication services such as telephony, video, data, messaging, broadcasts, and so on. Such networks, which are usually multiple access networks, support communications for multiple users by sharing the available network resources.

These wireless communication networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks and Wi-Fi networks.

Within such wireless communication networks, a variety of data services may be provided, including voice, video, and emails. More recently, wireless communication networks are being used for an even broader range of services and larger numbers of users. As the demand for mobile broadband access continues to increase, research and development continue to advance wireless communication technologies not only to meet the growing demand for mobile broadband access, but to advance and enhance the user experience.

BRIEF SUMMARY

The systems, networks, methods, devices and apparatuses of the disclosure each have several aspects. No single one of the aspects is solely responsible for desirable attributes of such systems, networks, methods, devices and apparatuses. Without limiting the scope of this disclosure as expressed by the claims which follow, some aspects will now be discussed briefly. After considering this discussion, and particularly after reading the section entitled "Detailed Description" one will understand how the aspects of this disclosure provide advantages that include improved communications between wireless nodes in a wireless network.

Certain aspects provide an apparatus for wireless communication. The apparatus generally includes (a) a processing system configured to (i) obtain a transmission opportunity (TXOP), (ii) generate a plurality of first frames, wherein one or more of the first frames include a control field having a first value and one or more of the first frames include data and (iii) apply a first modulation and coding scheme (MCS) to the plurality of the first frames and (b) an interface configured to (i) output the modulated and coded first frames for transmission to a second apparatus during the TXOP, wherein the first value indicates the second apparatus can only transmit control information during the TXOP and (ii) obtain, during the TXOP, an acknowledgment (ACK) frame indicating data of at least one of the first frames was received by the second apparatus. Furthermore, the processing system is further configured to determine a first error rate based on the ACK frame and compare the error rate to a target error rate and take one or more actions based on the comparison.

Certain aspects provide an apparatus for wireless communication. The apparatus generally includes an interface configured to obtain, during a TXOP owned by a second apparatus, at least one first frame from the second apparatus and a processing system configured to (i) determine a MCS associated with the at least one first frame, (ii) increase a value of a counter if the MCS associated with the at least one first frame is the same as a MCS associated with a frame previously obtained by the apparatus during the TXOP and (iii) take one or more actions based on the counter value.

Aspects generally include methods, apparatuses, computer readable mediums and wireless nodes, as substantially described herein with reference to and as illustrated by the accompanying drawings. Numerous other aspects are provided.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially used on other aspects without specific recitation.

DETAILED DESCRIPTION

Figure 1:
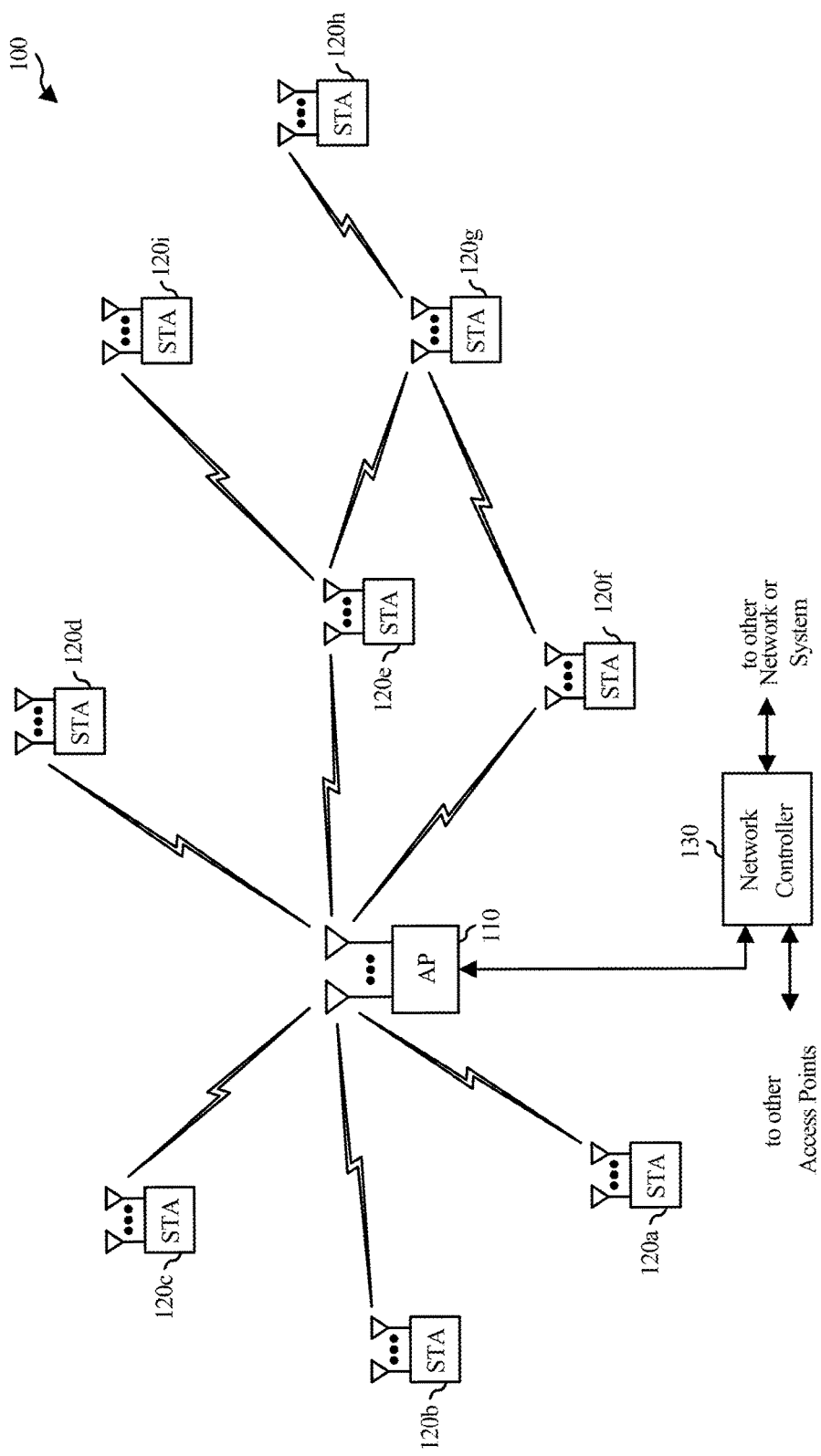
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The word "communicate" is used herein to mean "transmit", "receive" or "transmit and receive". The word "communications" is used herein to mean "transmission", "reception" or "transmission and reception".

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in different ways and may be incorporated into various types of communication networks or network components. In some aspects, the teachings herein may be employed in a multiple-access network capable of supporting communication with multiple users by sharing the available network resources (e.g., by specifying one or more of bandwidth, transmit power, coding, interleaving, and so on). For example, the teachings herein may be applied to any one or combinations of the following technologies or standards: Code Division Multiple Access (CDMA), Multiple-Carrier CDMA (MCCDMA), Wideband CDMA (W-CDMA), Time Division Multiple Access (TDMA), Frequency Division Multiple Access (FDMA), Single-Carrier FDMA (SC-FDMA), Orthogonal Frequency Division Multiple Access (OFDMA), cdma2000, W-CDMA, TDSCDMA, 802.11 (Wi-Fi), 802.16, Global System for Mobile Communication (GSM), Evolved UTRA (E-UTRA), IEEE 802.20, Flash-OFDM®, Long Term Evolution (LTE), Ultra-Mobile Broadband (UMB), Ultra-Wide Band (UWB), Bluetooth®, GSM/General Packet Radio Service (GPRS), Enhanced Data GSM Environment (EDGE), Terrestrial Trunked Radio (TETRA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), AMPS, or other technology of 3G, 4G, or 5G.

The techniques may be incorporated into (such as implemented within or performed by) a variety of wired or wireless apparatuses (such as nodes or devices). In some implementations, a node includes a wireless node. Such a wireless node may provide, for example, connectivity to or for a network [such as a wide area network (WAN) such as the Internet or a cellular network] via a wired or wireless communications link. In some implementations, a wireless node may be an access point or a user terminal.

EXAMPLE OF WIRELESS COMMUNICATIONS NETWORK

FIG. 1 illustrates a multiple-access Multiple Input Multiple Output (MIMO) network 100 with access points and user terminals. For simplicity, only one access point 110 is shown in FIG. 1. An access point (AP) is generally a fixed station that communicates with the user terminals and also may be referred to as a base station or some other terminology. A user terminal may be fixed or mobile and also may be referred to as a mobile station, an access terminal, a station (STA), a client, user equipment or some other terminology. A user terminal may be a cellular phone, a personal digital assistant (PDA), a handheld device, a wireless modem, a laptop computer, a personal computer, etc.

The access point 110 may communicate with one or more user terminals or stations 120 at any given moment on the downlink and uplink. The downlink (i.e., forward link) is the communications link from the access point to the user terminals, and the uplink (i.e., reverse link) is the communications link from the user terminals to the access point. A user terminal also may communicate peer-to-peer with another user terminal. A network controller 130 couples to and provides coordination and control for the access points.

The MIMO network 100 employs multiple transmit and multiple receive antennas for data transmission on the downlink and uplink. The access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In some implementations, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., $N_{ut} \geq 1$). The $N_u$ selected user terminals can have the same or different number of antennas.

The MIMO system or network 100 may be a time division duplex (TDD) network or a frequency division duplex (FDD) network. For a TDD network, the downlink and uplink share the same frequency band. For an FDD network, the downlink and uplink use different frequency bands. The MIMO network 100 also may use a single carrier or multiple carriers for transmission. Each user terminal may be equipped with a single antenna (such as in order to keep costs down) or multiple antennas (such as where the additional cost can be supported). The MIMO network 100 may represent a high speed Wireless Local Area Network (WLAN) operating in a 60 GHz band.

Figure 2:
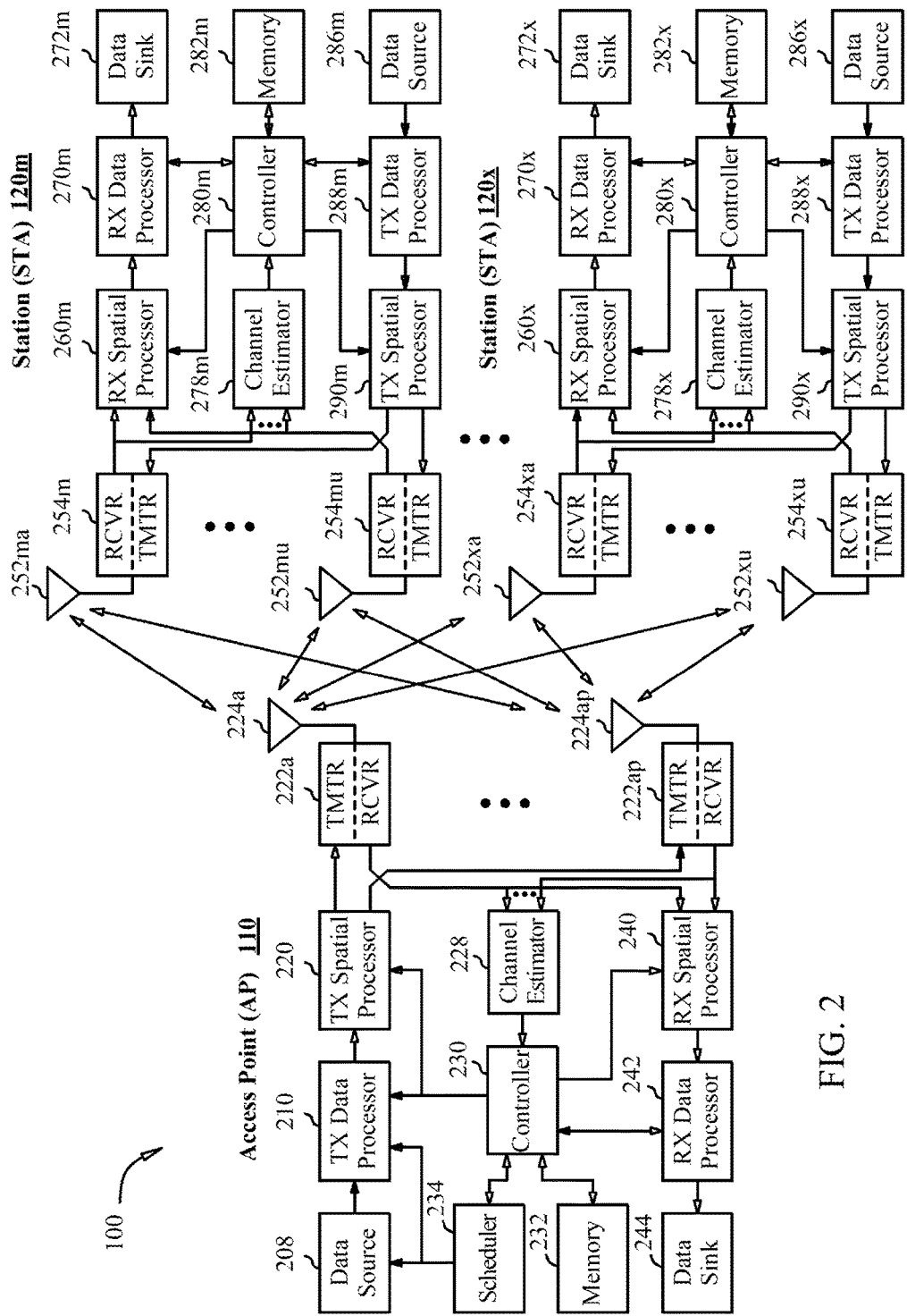
FIG. 2 is a block diagram of an example access point and example stations, in accordance with certain aspects of the present disclosure.

FIG. 2 illustrates example components of the access point 110 and user terminal or station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 5, 5A, 7, and 7A.

FIG. 2 shows a block diagram of the access point/base station 110 and two user terminals 120m and 120x in a MIMO network 100. The access point 110 is equipped with $N_{ap}$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. Moreover, $N_{up}$ may or may not be equal to $N_{dn}$, and $N_{up}$ and $N_{dn}$ may include static values or can change for each scheduling interval. Beamforming (such as beam-steering) or some other spatial processing techniques may be used at the access point and user terminal.

On the uplink, at each user terminal 120 selected for uplink transmission, a TX data processor 288 receive traffic data from a data source 286 and control data from a controller 280. The controller 280 may be coupled with a memory 282. The TX data processor 288 processes (such as encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. The $N_{ut,m}$ transmitter units 254 provide $N_{ut,m}$ uplink signals for transmission from the $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At the access point 110, the $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the $N_{ap}$ received symbol streams from the $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (such as demodulates, de-interleaves, and decodes) each recovered uplink data symbol stream $\{s_{up,m}\}$ in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals. The decoded data for each STA may be provided to a data sink 272 for storage and/or a controller 280 for further processing.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{S_{dn,m}\}$ for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
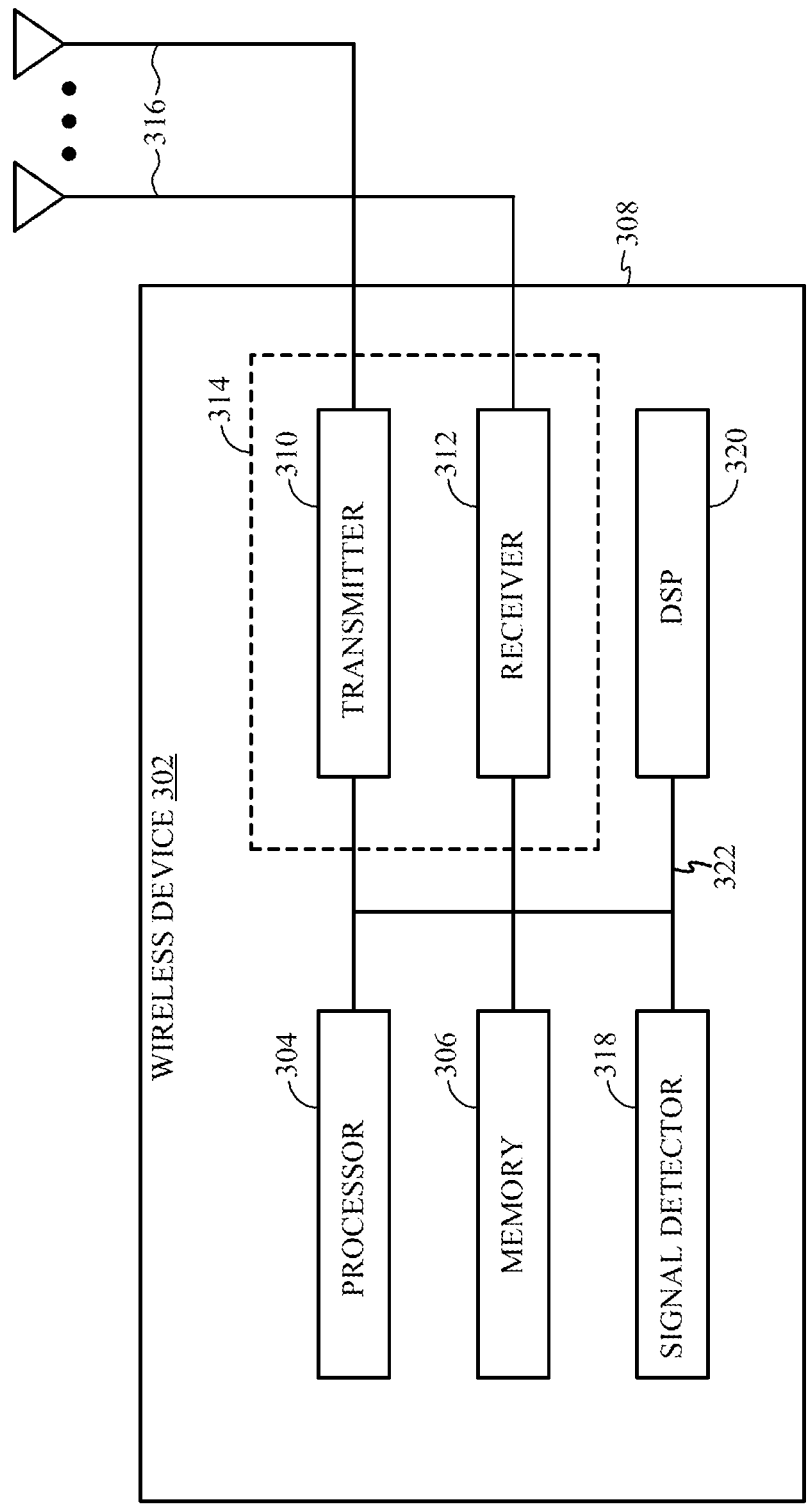
FIG. 3 illustrates an example wireless device, in accordance with certain aspects of the present disclosure.

FIG. 3 illustrates various components that may be used in a wireless device 302 that may be employed within the MIMO network 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 also may be referred to as a central processing unit (CPU). Memory 306, which may include both read-only memory (ROM) and random access memory (RAM), provides instructions and data to the processor 304. A portion of the memory 306 also may include non-volatile random access memory (NVRAM). The processor 304 typically performs logical and arithmetic operations based on program instructions stored within the memory 306. The instructions in the memory 306 may be executable to implement the methods described herein.

The wireless device 302 also may include a housing 308 that may include a transmitter 310 and a receiver 312 to allow transmission and reception of data between the wireless device 302 and a remote location. The transmitter 310 and the receiver 312 may be combined into a transceiver 314. A plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

A contention-based protocols is a communications protocol for operating wireless telecommunication equipment that allows many devices to use the same radio channel without pre-coordination. Each device contends for a time period to communicate its information such as data and control information. Once the device won the contention for a particular time period, which is also known as a transmission opportunity (hereinafter "TXOP"), such device could transmit information and also could grant permission to another device to transmit during such TXOP.

During a particular TXOP, an owner of such TXOP could also perform link adaptation so as to determine a modulation scheme and a coding rate of the error correction that are ideal for communication according to the quality of the radio link. If the conditions of the radio link are good, a high-level efficient modulation scheme and a small amount of error correction is used. For example, a modulation and coding scheme (MCS) with an index value 5 is used when the conditions of the radio link are good and a MCS with an index value of 2 is used when the conditions of the radio link are not as good. In general, a higher MCS means more information can be transmitted but the chance of reception of the transmitted information by another device is less than a chance of reception of the transmitted information associated with a lower MCS.

To maximize data throughput, the owner of the TXOP (hereinafter the "initiator") can also grant permission to another device (responder) to transmit information during the TXOP. That is, reverse direction is enabled and thus both initiator and responder could simultaneously perform link adaptation. If so, the ACKs or Block ACKs being transmitted by the responder to the initiator might not be detected by the initiator and vice versa. Thus, it would be better if the responder would transmit data when link adaptation is not being performed by the initiator since data transmission by the responder would skew channel conditions and, thus, yield a lower MCS determined by the initiator via link adaptation.

The following examples of apparatuses, methods, computer readable mediums and wireless nodes effectively (1) perform link adaptation during the TXOP and, thereafter, allow a responder to transmit data during the remainder of the TXOP and (2) determine whether link adaptation is being performed during a TXOP owned by the initiator and, if not, transmit data during the TXOP.

EXAMPLE OF EXPLICIT INDICATION THAT INITIATOR IS FINISHED PERFORMING LINK DAPTATION

Figure 4:
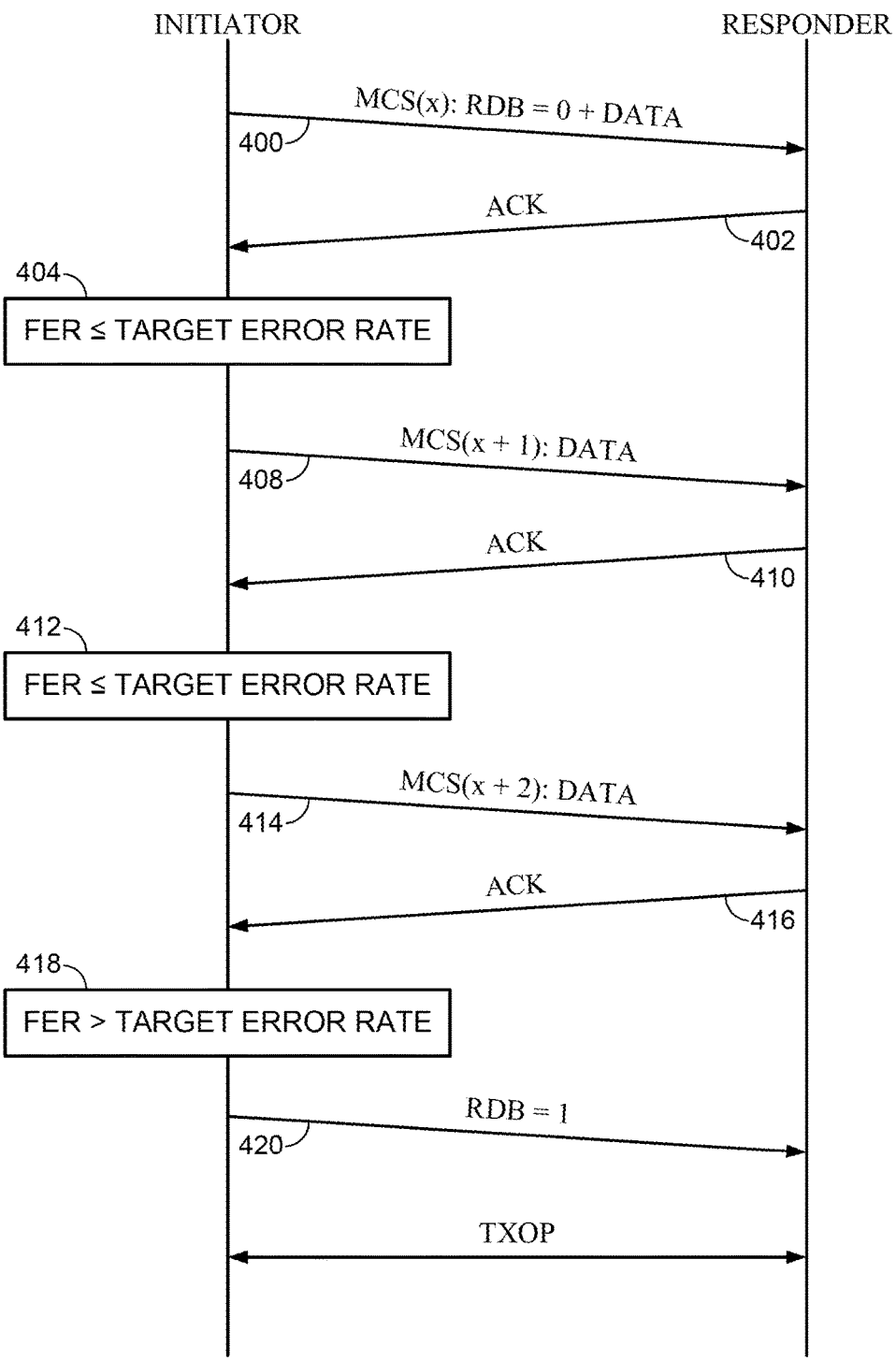
FIG. 4 illustrates messages being exchanged between an initiator and a responder during a transmission opportunity owned by the initiator and with a reverse direction bit initially set to 0 in accordance with certain aspects of the present disclosure.

FIG. 4 illustrates messages being exchanged between an initiator and a responder during a transmission opportunity owned by the initiator and with a reverse direction bit initially set to 0 in accordance with certain aspects of the present disclosure. The initiator can be an AP such as the AP 110 of FIG. 1 or FIG. 2 and the responder can be an STA such as one of the stations of FIG. 1 or STA 120*m* of FIG. 2. In other aspects, the initiator can be an STA and the responder can be the AP or both initiator and responder are STAs.

In general, FIG. 4 illustrates the initiator performing link adaptation during the TXOP owned by the initiator. To proceed with link adaptation, the initiator sets a reverse direction bit (hereinafter "RD bit") to a first value to indicate only the initiator can transmit data during the TXOP. Once the initiator is finished with link adaptation, it sets a RD bit to a second value to indicate the responder can also transmit data during the remainder of the TXOP.

More specifically, the initiator initially sets a RD bit to a first value such as 0 to indicate that the responder can only transmit control information during the TXOP or cannot transmit any data during the TXOP. The initiator then begins link adaptation by transmitting the RD bit and data to the responder via message 400. The initiator applies a MCS(x) to the data with "x" being the index value and then transmits the modulated and coded data to the responder. The responder then transmits an acknowledgement (hereinafter "ACK") 402 such as an ACK frame indicating it had received the transmitted data. In certain aspects, the message 400 includes multiple data frames therein and thus the responder could send a block ACK frame having a bit map with a particular bit indicating a particular data frame was received.

Based on the ACK 402, the initiator determines a frame error rate (hereinafter "FER") and thereafter compares the FER to a target error rate, which is preferably 10% and could be adjusted upward to, e.g., 15% or downward to, e.g., 5%. If the comparison indicates the FER is less than or equal to the target error rate per block 404, the initiator could certainly continue to use MCS(x) for data transmission but the initiator would be able to send more data if it could use a higher MCS. Thus, the initiator applies a higher MCS to additional data and transmits such modulated and coded additional data 408 to the responder. In the aspect depicted in FIG. 4, the higher MCS is MCS(x+1). Alternatively, the initiator can select a MCS having an index value that is 2 or more than the value of x and, for the selection, the initiator is aware that selecting a higher MCS for modulating and coding data tends to lead to a lesser chance of reception of such modulated and coded data by responder.

After the data transmission 408, the initiator receives ACK 410 from the responder, determines another FER based on ACK 410 and compares the FER to the target error rate. Block 412 indicates the FER is still less than or equal to the target error rate and thus the initiator applies an even higher MCS such as MCS(x+2) as depicted in FIG. 4 to more data and transmits such modulated and coded data 414 to the responder. Thereafter, initiator receives ACK 416 from the responder, determines another FER based on ACK 416 and compares the FER to the target error rate. Block 418 indicates the latest FER is greater than the target error rate and such indication means the initiator is finished with link adaptation since the previous MCS or MCS(x+1) is the highest MCS that could be used with tolerable error rate associated with data reception at an intended receiver such as the responder. As a result, the initiator sets a RD bit to 1 and transmits such RD bit 420 to the responder so as to allow the responder to transmit any information including data during the remainder of the TXOP. In certain aspects, the responder can begin its own link adaptation during the TXOP by transmitting data to another device such as the initiator since conditions of the radio link at the initiator for data reception will likely be different from the conditions of the radio link at the responder for data reception.

Certain messages of with FIG. 4 are further explained below in accordance with certain aspects being described herein with respect to FIG. 5.

Figure 5:
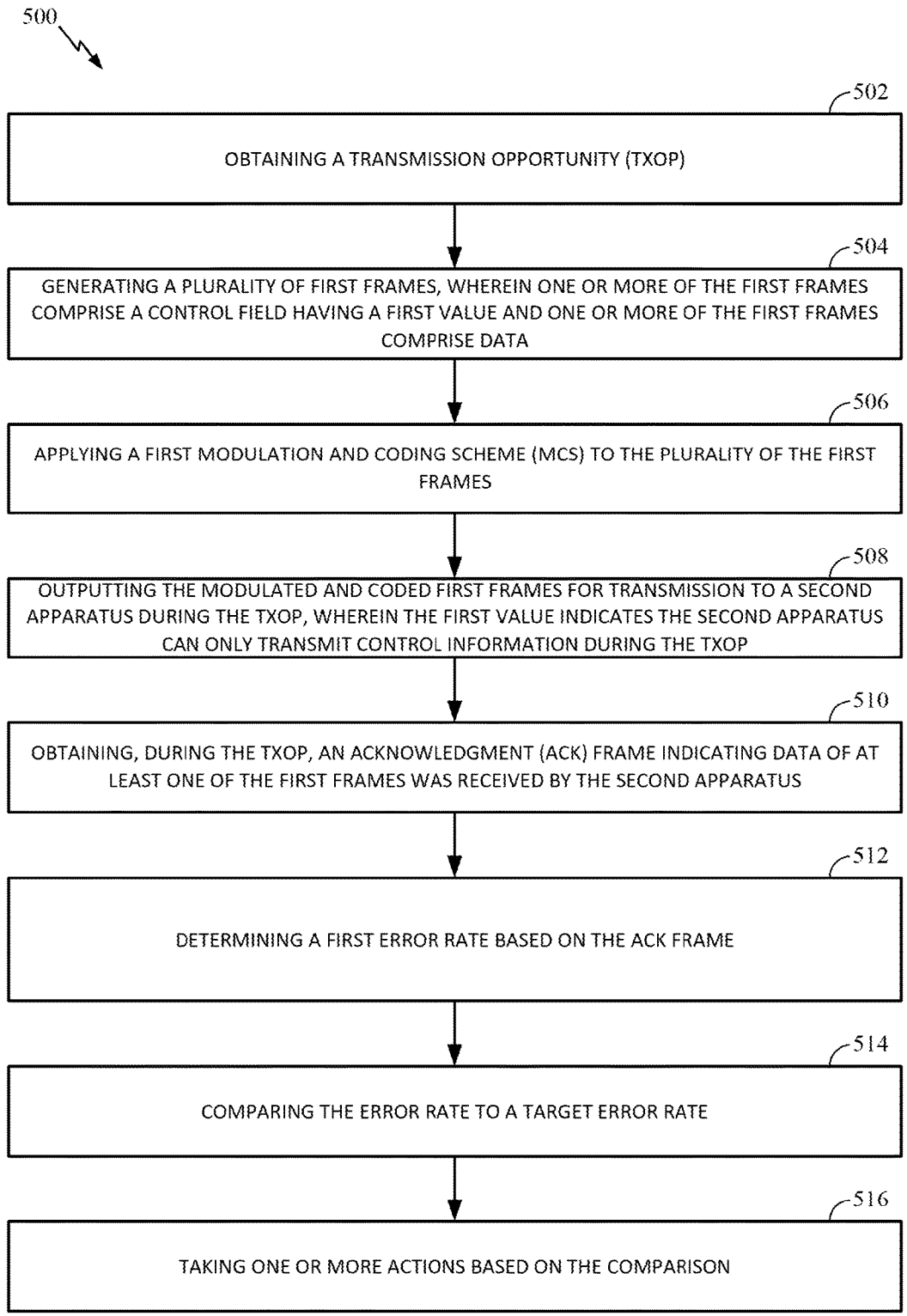
FIG. 5 is a flow diagram of example operations for wireless communications, in accordance with certain aspects of the present disclosure.
Figure 5A:
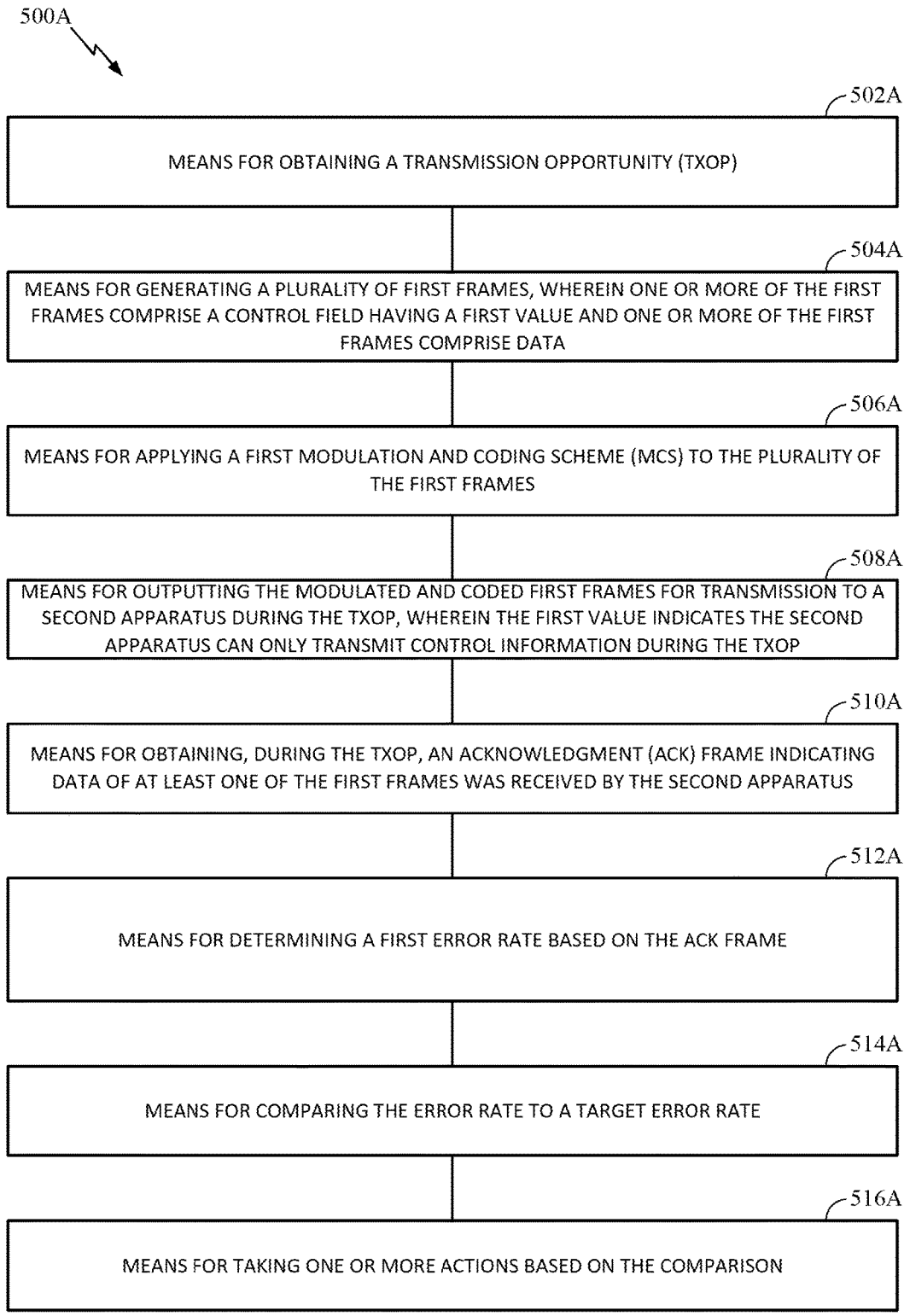
FIG. 5A illustrates example components capable of performing the operations shown in FIG. 5, in accordance with certain aspects of the present disclosure.

FIG. 5 is a flow diagram of example operations 500 for wireless communications, in accordance with certain aspects of the present disclosure. The operations 500 may be performed by an apparatus or a wireless device 302 of FIG. 3.

At block 502, the apparatus, which could also be the initiator of FIG. 4, obtains a TXOP by contending for it. Since the apparatus is the owner of the TXOP, it can transmit whatever it wants.

At block 504, the apparatus generates a plurality of first frames for transmission to a second apparatus, which could be the responder of FIG. 4. The plurality of first frames has at least one frame with a control field therein and at least one frame with data therein, i.e., at least one data frame. In certain aspects, the frame having the control field is a control frame such as a NULL frame or QoS NULL frame having no data payload therein and the control field has a RD bit with a first value such as 0 to indicate that the second apparatus can only transmit control information during the TXOP. Control information can be an ACK frame or a block ACK frame. However, the second apparatus cannot transmit any data after reception of the RD bit with the value of 0 since the apparatus is performing link adaptation during this TXOP.

At block 506, the apparatus applies a first MCS to the first frames. In certain aspects, the first MCS can be a MCS that was previously used by the apparatus to communicate with the second apparatus. At block 508, the apparatus outputs the modulated and coded first frames such as message 400 for transmission to the second apparatus during the TXOP. At block 510, the apparatus obtains an acknowledgment such as ACK 402 from the second apparatus indicating at least one data frame was received by the second apparatus. In certain aspects, the ACK is an ACK frame or a block ACK frame, which indicates two or more data frames were received by the second apparatus.

Based on the ACK, the apparatus determines a first error rate such as a frame error rate at block 512, compares the error rate to a target error rate at block 514 and takes one or more actions based on the comparison at block 516.

If the comparison at block 514 indicates the first error rate is less than or equal to the target error rate and an index value of the first MCS is the highest among index values of MCSs associated with the apparatus including the first MCS, the one or more actions at block 516 include (a) generating a second frame having a control field with a second value indicating the second apparatus can, after reception of the second frame, transmit data, (b) applying the first MCS to the second frame and (c) output the modulated and coded second frame for transmission to the second apparatus during the TXOP.

For this aspect, the first MCS is the highest MCS that can be used by the apparatus to modulate and code data. Since the first or the highest MCS yields tolerable FER, the apparatus is finished with link adaptation and, thereafter, sets the second value of the control field of the second frame to a value different from the first value of 0. Thus, the second value is preferably 1 to indicate that the second apparatus is allowed to transmit data as well as control information during the remainder of the TXOP. By allowing the second device to also transmit any information during the remainder of the TXOP, efficient use of such TXOP for communication is achieved. For example, if the second apparatus has data in its buffer for the apparatus, the second apparatus can transmit such data to the apparatus during the apparatus's TXOP without contending for a TXOP or waiting for its own TXOP. In addition, the second apparatus can also begin its own link adaptation during the remainder of the TXOP.

After outputting the modulated and coded second frame for transmission at block 516, the apparatus can obtain another ACK, a data frame or both from the second apparatus. In certain aspects, the second frame is a control frame such as a NULL frame or QoS NULL frame. In other aspects, the second frame also includes data payload therein.

If the comparison at block 514 indicates the first error rate is less than or equal to the target error rate, the one or more actions at block 516 include (1) generating at least one second frame having data, (2) applying a second MCS to the at least one second frame, wherein an index value of the second MCS is higher than an index value of the first MCS and (3) outputting the at least one modulated and coded second frame for transmission to the second apparatus during the TXOP.

For this aspect, the apparatus realizes that using the first MCS might not be optimal or yield the greatest data throughput especially if the first error rate is less than the target error rate. Thus, the apparatus then uses a MCS that is higher than the first MCS to modulate and code additional data for transmission to the second apparatus similar to the data transmission 408 or 414 of FIG. 4 and, if the FER continues to be less or equal to the target error rate, repeats steps (1)-(3) of block 516 by generating another frame having data (data frame) and applying a higher MCS until the FER associated with a particular MCS is greater than the target error rate. At that time, the apparatus realizes the MCS used immediately prior to the latest MCS should be used for communication until the next link adaptation. As a result, the current link adaptation is finished, and the apparatus sets a RD bit to a value of 1 and outputs such RD bit for transmission to the second apparatus.

If the comparison at block 514 indicates the first error rate is greater than the target error, the one or more actions at block 516 include (i) generating at least one second frame having data, (ii) applying a second MCS to the at least one second frame, wherein an index value of the second MCS is lower than an index value of the first MCS and (iii) outputting the at least one modulated and coded second frame for transmission to the second apparatus during the TXOP.

For this aspect, the apparatus realizes data reception at the second apparatus was not robust since the FER associated with the first MCS is greater than the target error rate. Thus, the apparatus then uses a lower MCS, i.e., the second MCS with the index value being lower than the index value of the first MCS to encode and modulate data for further transmission. In certain aspects, the second MCS is a MCS that was previously used by the apparatus to communicate with the second apparatus during the same TXOP or a previous TXOP. In other aspects, the second MCS is one lower than the first MCS. That is, if the first MCS has an index value of 6, the second MCS has an index value of 5.

If the FER continues to be greater than the target error rate, the apparatus repeats steps (i)-(iii) by generating another data frame and using a MCS with an index value one less than the index value of the MCS associated with the FER that is greater than the target error rate. Once the FER is less than or equal to the target error rate, the current link adaptation is finished. Thus, the apparatus sets a RD bit to a value of 1 and outputs such RD bit for transmission to the second apparatus.

EXAMPLE OF IMPLICIT INDICATION THAT INITIATOR IS NOT PERFORMING LINK DAPTATION

Figure 6:
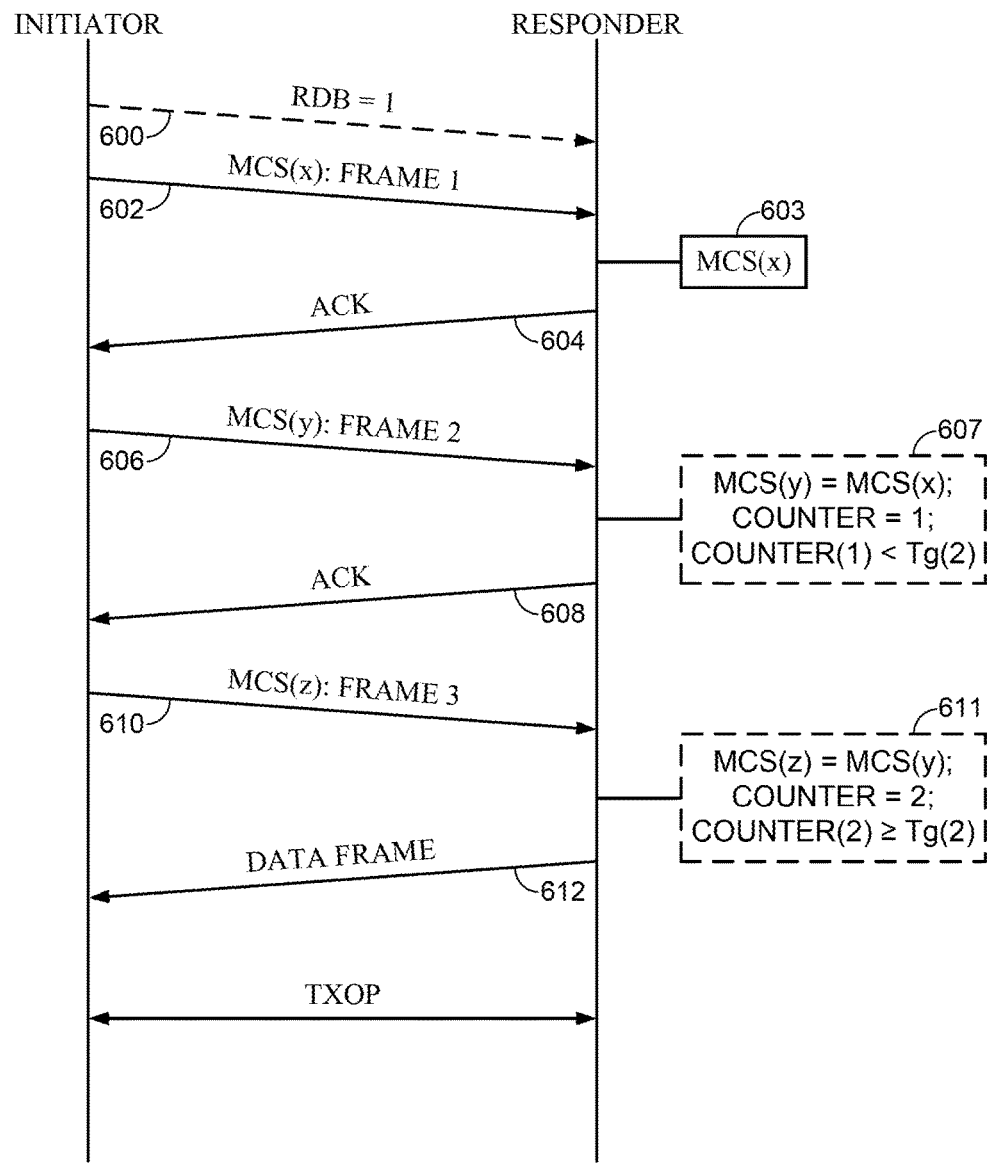
FIG. 6 illustrates messages being exchanged between an initiator and a responder during a transmission opportunity owned by the initiator and with the reverse direction bit initially set to 1 in accordance with certain aspects of the present disclosure.

FIG. 6 illustrates messages being exchanged between an initiator and a responder during a transmission opportunity owned by the initiator and with a reverse direction bit initially set to 1 in accordance with certain aspects of the present disclosure. The initiator can be an AP such as the AP 110 of FIG. 1 or FIG. 2 and the responder can be an STA such as one of the stations of FIG. 1 or STA 120m of FIG. 2. In other aspects, the initiator can be an STA and the responder can be the AP or both initiator and responder are STAs.

In general, FIG. 6 illustrates the initiator optionally setting the RD bit to a first value to indicate the responder can transmit any information during the TXOP owned by the initiator. Regardless, the responder does not transmit any data during such TXOP until the responder determines that link adaptation is not being performed by the initiator. For example, such determination can be a result of the responder recognizing the MCS being used by the initiator to transmit data has not changed for several data transmissions.

As discussed above, the responder may receive a message 600 having a RD bit with value of 1 therein to indicate the responder can transmit any information, e.g., control information and data, during the TXOP. Regardless, the responder refrains from transmitting any data. Thereafter, the responder receives a message 602 with frame 1 therein.

At block 603, the responder determines that MCS(x) was used to modulate and code such frame 1, stores the result of the determination or MCS(x) in its memory and transmits an acknowledgement 604 to the initiator indicating frame 1 was received. Thereafter, the responder further receives a message 606 with frame 2 therein.

At block 607, the responder determines that MCS(y) was used to modulate and code such frame 2, increases a value of a counter(0) by 1 from the initial value of 0 since MCS(y)=MCS(x) and compares counter(1) to a target value of 2 as depicted by Tg(2) in FIG. 6. If MCS(y) does not equal MCS(x), the responder does not increase the counter value and will use MCS(y) as the baseline MCS for the next comparison.

Regarding the counter value, the responder sets the initial value of the counter to 0 at the start of each TXOP and increases such counter value by 1 if a previous MCS used to transmit data by the initiator is the same as the latest or current MCS used to transmit data by the initiator or maintains such counter value at 0 if the previous MCS is different from the current MCS. If a MCS associated with the next data transmission also matches the previous MCS, the responder continues to increase the counter value by 1. If not, the responder resets the counter value to 0 and will use the latest MCS for comparison with a MCS associated with the next data transmission from the initiator and so on.

Regarding the target value, such value is a target of when the responder can transmit data if the counter value is the same as the target value. In other words, when the counter value is equal to the target value, that equivalence indicates the initiator is not performing link adaptation and thus the responder can transmit data. In addition, the responder can determine the target value for its own use or can receive the target value from the responder.

In certain aspects, the responder can determine the target value based on communication with the initiator during a previous or different TXOP. For Wi-Fi communications, the conditions of the radio link typically do not change drastically and thus if the initiator was performing link adaptation during the previous TXOP, it would be unlikely that the initiator will perform link adaptation again in the following TXOP. Therefore, the responder preferably sets target value to a low value such as 1 or 2. Alternatively, the responder can set the target value to 3 or higher if the responder determines that the initiator has not performed any link adaptation for a threshold period of time such as three consecutive TXOPs.

In other aspects, the initiator informs the responder what target value to use. For example, if the initiator plans on transmitting three training frames by using the same MCS to see whether the initiator should use such MCS, the initiator can inform the responder in advance of its plan and thus the responder would then set the target value to 2 since the MCS associated with the first training frame would not be compared to any MCS and it would be used as a baseline MCS such as MCS(x) of FIG. 6.

Since counter(1) is still less than Tg(2) per comparison at block 607, the responder transmits an acknowledgement 608 indicating frame 2 was received. Thereafter, the responder receives a message 610 with frame 3 therein.

At block 611, the responder determines that MCS(z) was used to modulate and code such frame 2, increases counter (1) by 1 since MCS(z)=MCS(y) and compares counter(2) with Tg(2). The comparison shows that the counter value of 2 and target value of 2 are equal and thus their equality implicitly indicates that the initiator is not performing link adaptation or is finished with performing link adaptation since the MCS being used by the initiator has remained constant. Alternatively, the responder can be configured to transmit data if the counter value is greater than the target value, which indicates no link adaptation is being performed by the initiator.

Based on the counter value being equal to or greater than the target value, the responder can transmit data or data frame(s) 612 to the initiator during the TXOP. In certain aspects, the responder can begin link adaptation starting with the transmission of data frame 612.

Certain messages of with FIG. 4 are further explained below in accordance with certain aspects being described herein with respect to FIG. 7.

Figure 7:
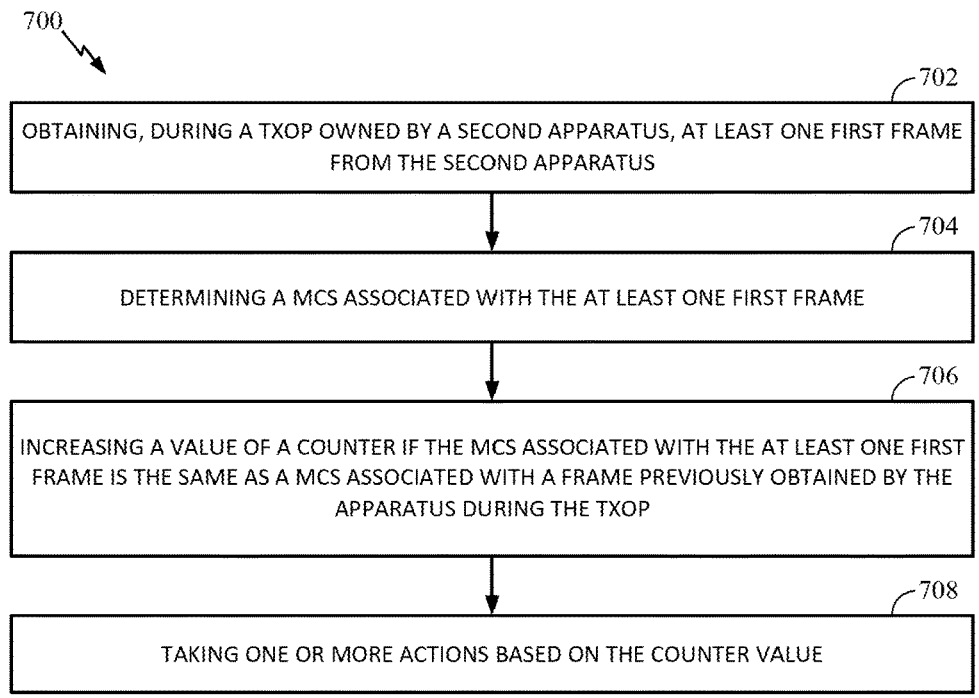
FIG. 7 is a flow diagram of example operations for wireless communications, in accordance with certain aspects of the present disclosure.
Figure 7A:
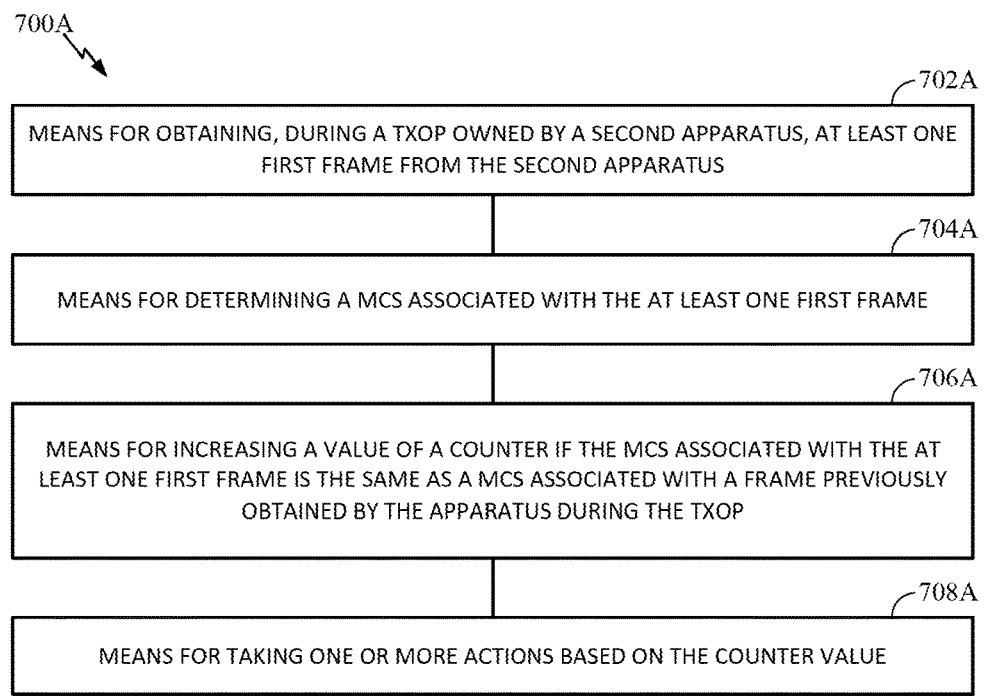
FIG. 7A illustrates example components capable of performing the operations shown in FIG. 7, in accordance with certain aspects of the present disclosure.

FIG. 7 is a flow diagram of example operations 700 for wireless communications, in accordance with certain aspects of the present disclosure. The operations 700 may be performed by an apparatus or a wireless device 302 of FIG. 3.

At block 702, the apparatus, which could be the responder of FIG. 6, obtains at least one first frame such as a frame in the message 602, 606 or 610 of FIG. 6 from a second apparatus, which could be the initiator of FIG. 6, during a TXOP owned by the second apparatus. In certain aspects, the at least one first frame includes a control field having a RD bit with a first value such as 1 indicating the apparatus can transmit data during the TXOP. Even though the second apparatus allows the apparatus to transmit data, the apparatus won't transmit any data until it determines that the second apparatus is not performing link adaption or is finished with performing link adaptation. Thus, the reception or non-reception of the RD bit with the value of 1 does not change the operations of the apparatus.

At block 704, the apparatus determines a MCS associated with the at least one first frame. Such determination is similar to the determination associated with one of the blocks 603, 607 and 611 of FIG. 6.

At block 706, the apparatus increases a value of a counter if the determined MCS, e.g., MCS(y) of FIG. 6, is the same as a MCS associated with a frame previously obtained by the apparatus during the same TXOP, e.g., MCS(x) of FIG. 6. See, also, block 607 of FIG. 6.

At block 708, the apparatus takes one or more actions based on the counter value.

If the counter value is equal to or greater than a target value, the one or more actions include generating at least one second frame having data and outputting the at least one second frame for transmission to the second apparatus during the TXOP. In other aspects, before outputting the at least one second data frame for transmission, the one or more actions include generating an acknowledgement indicating data of the least one first frame was received by the apparatus and outputting the ACK for transmission to the second apparatus during the TXOP.

Before outputting the at least one second data frame and the ACK for transmission, the apparatus can use the same MCS to modulate and code the at least one second data frame and the ACK. Alternatively, the MCS associated with the at least one second data frame is higher than the MCS associated with the ACK. This is especially true if the transmission of the at least one second data frame is the start of link adaptation by the apparatus, which is trying to find the highest MCS that it can use without compromising data reception. Furthermore, the apparatus can use the same MCS associated with a previous data transmission to modulate and code the at least one second data frame especially if the apparatus had received an ACK indicating such previous data transmission was successful. Moreover, the apparatus can use a MCS, which is higher than the MCS associated with the previous successful data transmission, to modulate and code the at least one second data frame especially, again, if the transmission of the at least one second data frame is the start of link adaptation.

If the counter value is less than the target value, the one or more actions include (1) generating an acknowledgement indicating data of the least one first frame was received by the apparatus, (2) outputting the ACK for transmission to the second apparatus during the TXOP, (3) obtaining at least one second frame from the second apparatus during the TXOP, (4) determining a MCS associated with the at least one second frame and (5) increasing the counter value if the MCS associated with the at least one second frame is the same as the MCS associated with the least one first frame. If the counter value is still less than the target value, repeat steps (1)-(5) by generating another ACK and obtaining another frame from the second apparatus.

In certain aspects, the at least one first frame obtained per block 702 includes a control field having a first value indicating the apparatus can transmit data during the TXOP and, thus, the one or more actions include generating a second frame comprising data if the counter value is equal to or greater than a target value and outputting the second frame for transmission during the TXOP. As discussed above, even if the apparatus is allowed to transmit data by the TXOP owner during the TXOP, the apparatus does not or refrain from outputting any data for transmission during such TXOP unless the counter value is equal to or greater than the target value. That is, the apparatus must determine that link adaptation is either finished or not being performed during the TXOP before the apparatus transmits any data.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. More specifically, operations 500 illustrated in FIG. 5 correspond to means 500A illustrated in FIG. 5A and operations 700 illustrated in FIG. 7 correspond to means 700A illustrated in FIG. 7A.

For example, means for transmitting (or means for outputting for transmission) may include a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may include a receiver (e.g., the receiver unit 222) and/or an antenna(s) 224 of the access point 110 or the receiver unit 254 and/or antenna(s) 252 of the station 120 illustrated in FIG. 2. Means for processing, means for determining, means for obtaining, means for generating, means for applying, means for comparing, means for increasing or means for taking one or more actions may include a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame, a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall network or system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communications media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may include a single instruction, or many instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication comprising:
an interface configured to obtain, during a TXOP owned by a second apparatus, at least one first frame from the second apparatus; and
a processing system configured to:
determine a MCS associated with the at least one first frame;
increase a value of a counter if the MCS associated with the at least one
first frame is the same as a MCS associated with a frame previously
obtained by the apparatus during the TXOP; and
take one or more actions based on the counter value.

2. The apparatus of claim 1, wherein:
if the counter value is equal to or greater or greater than a target value, the one or more actions comprise generating at least one second frame comprising data; and
the interface is configured to output the at least one second frame for transmission to the second apparatus during the TXOP.

3. The apparatus of claim 2, wherein:
the one or more actions further comprise generating an acknowledgement (ACK) indicating data of the least one first frame was received by the apparatus; and
the interface is further configured to output the ACK for transmission to the second apparatus during the TXOP.

4. The apparatus of claim 3, wherein a MCS associated with the at least one second frame is the same as a MCS associated with the ACK.

5. The apparatus of claim 3, wherein an index value of the MCS associated with the at least one second frame is higher than an index value of the MCS associated with the ACK.

6. The apparatus of claim 3, wherein a MCS associated with the at least one second frame is the same as a MCS associated with a frame comprising data that was previously outputted by the apparatus for transmission.

7. The apparatus of claim 3, wherein an index value of a MCS associated with the at least one second frame higher than an index value of a MCS associated with a frame comprising data that was previously outputted by the apparatus for transmission.

8. The apparatus of claim 1, wherein:
if the counter value is less than a target value, the one or more actions comprise generating an acknowledgement (ACK) indicating data of the least one first frame was received by the apparatus;
the interface is further configured to:
output the ACK for transmission to the second apparatus during the TXOP; and obtain at least one second frame from the second apparatus during the TXOP; and the processing system is further configured to:
determine a MCS associated with the at least one second frame; and
increase the counter value if the MCS associated with the at least one second frame is the same as the MCS associated with the least one first frame.

9. The apparatus of claim 2, wherein the interface is further configured to obtain the target value from the second apparatus.

10. The apparatus of claim 2, wherein the processing system is further configured to determine the target value based on communication with the second apparatus during at least one previous TXOP.

11. The apparatus of claim 1, wherein:
the at least one first frame comprises a control field having a first value indicating the apparatus can transmit data during the TXOP;
the one or more actions comprise generating a second frame comprising data if the counter value is equal to or greater than a target value; and
the interface is further configured to output the second frame for transmission to the second apparatus during the TXOP.

12. The apparatus of claim 11, wherein the first value is 1.

13. A method for wireless communication by an apparatus, comprising:
obtaining, during a TXOP owned by a second apparatus, at least one first frame from the second apparatus;
determining a MCS associated with the at least one first frame;
increasing a value of a counter if the MCS associated with the at least one first frame is the same as a MCS associated with a frame previously obtained by the apparatus during the TXOP; and
taking one or more actions based on the counter value.

14. The method of claim 13, wherein:
if the counter value is equal to or greater than a target value, said taking one or more actions comprises generating at least one second frame comprising data; and
the method further comprising outputting the at least one second frame for transmission to the second apparatus during the TXOP.

15. The method of claim 14, wherein:
said taking one or more actions further comprises generating an acknowledgment (ACK) indicating data of the least one first frame was received by the apparatus; and
the output further comprises outputting the ACK for transmission to the second apparatus during the TXOP.

16. The method of claim 13, wherein:
if the counter value is less than a target value, said taking one or more actions comprises generating an acknowledgment (ACK) indicating data of the least one first frame was received by the apparatus;
the method further comprising outputting the ACK for transmission to the second apparatus during the TXOP; and
said obtaining further comprises obtaining at least one second frame from the second apparatus during the TXOP;
the determination further comprises determining a MCS associated with the at least one second frame; and
the increase further comprises increasing the counter value if the MCS associated with the at least one second frame is the same as the MCS associated with the least one first frame.

17. The method of claim 14, wherein said obtaining further comprises obtaining the target value from the second apparatus.

18. The method of claim 14, wherein the determination further comprises determining the target value based on communication with the second apparatus during at least one previous TXOP.

19. The method of claim 13, wherein:
the at least one first frame comprises a control field having a first value indicating the apparatus can transmit data during the TXOP;
said taking one or more actions comprises generating a second frame comprising data if the counter value is equal to or greater than a target value; and
the method further comprising outputting the second frame for transmission to the second apparatus during the TXOP.

20. A wireless node comprising:
a receiver configured to receive, during a TXOP owned by a second apparatus, at least one first frame from the second apparatus; and
a processing system configured to:
determine a MCS associated with the at least one first frame;
increase a value of a counter if the MCS associated with the at least one first frame is the same as a MCS associated with a frame previously obtained by the apparatus during the TXOP; and
take one or more actions based on the counter value.

* * * * *